United States Patent Office 3,549,629
Patented Dec. 22, 1970

3,549,629
2 - SUBSTITUTED OR UNSUBSTITUTED CAR-
BOXY TETRAHYDRO - HALO - SULFAMYL-
QUINAZOLINONES
Bola Vithal Shetty, Rochester, N.Y., assignor to Pennwalt Corporation, East Orange, N.J., a corporation of Pennsylvania
No Drawing. Filed Feb. 29, 1968, Ser. No. 709,209
The portion of the term of the patent subsequent to Dec. 26, 1984, has been disclaimed and dedicated to the Public
Int. Cl. C07d 51/48
U.S. Cl. 260—247.1
46 Claims

ABSTRACT OF THE DISCLOSURE

A 1,2,3,4-tetrahydro-halo-sulfamyl-quinazolinone having diuretic properties characterized by having in the 3-position a substituted or unsubstituted aryl or aralkyl group, and by having in the 2-position a substituted or unsubstituted carboxy group.

---

The invention relates to 1,2,3,4-tetrahydro-7-halo-6-sulfamyl-4-quinazolinones having diuretic properties characterized by having in the 3-position an aryl or aralkyl group and by having in the 2-position a substituted or unsubstituted carboxy group.

More particularly the invention relates to compounds having the following formula:

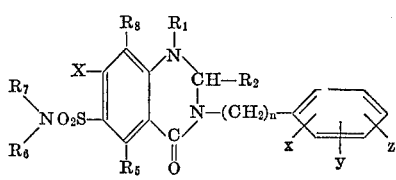

or the pharmaceutically acceptable salts thereof, wherein $R_1$ is hydrogen, loweralkyl, or phenylloweralkyl.
$R_2$ is carboxy, carboxylalkyl, loweralkanoyloxy, loweralkanoyloxy substituted alkyl, —CONH$_2$, —alkyl—CONH$_2$, —CONH—loweralkyl, alkyl—CONH—loweralkyl, —CON(loweralkyl)$_2$,

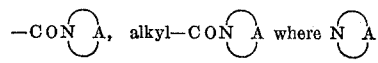

represents a heterocyclic ring;
$R_5$ is hydrogen, loweralkyl, loweralkoxy, loweralkoxy-loweralkyl, hydroxy, amino, alkylamino, or cyano;
$R_8$ is any of $R_5$;
$R_6$ is H, lower alkyl, or phenylloweralkyl;
$R_7$ is any of $R_6$, and $R_6$ and $R_7$ may be joined together to form with the N atom a heterocyclic ring such as piperidyl, pyridino, morpholino;
$x$ is hydrogen, loweralkyl, hydroxy, loweralkoxy, loweralkoxy-loweralkyl, amino, sulfamyl, halogen, cyano, or trifluoromethyl; $y$ and $z$ are any of $x$;
X is halogen, trifluoromethyl or cyano and $n$ is an integer from 0 to 4.

In the above formula X is preferably chlorine or trifluoromethyl, but bromine and the other halogens are not precluded. $R_1$ is preferably hydrogen, but benzyl and lower-alkyls such as methyl, ethyl, propyl, and isopropyl may be used. $R_2$ is preferably carboxy or carboxymethyl, $x$, $y$, and $z$ may be any of the stated radicals in one or more of the ortho, meta or para positions. Preferably $x$ is methyl in the ortho position, also where sufamyl is used it is preferably present in the meta or para position with methyl in the ortho position.

Specific suitable compounds of the above formula include
2-carboxymethyl-3-o-tolyl-6-sulfamyl-7-chloro-1,2,
3,4-tetrahydro-4-quinazolinone;
2-carboxymethyl-3-o-tolyl-6-sulfamyl-7-trifluoromethyl-
1,2,3,4-tetrahydro-4-quinazolinone;
2-carboxy-3-o-tolyl-6-sulfamyl-7-chloro-1,2,3,4-
tetrahydro-4-quinazolinone;
2-carboxyethyl-3-o-tolyl-6-sulfamyl-7-trifluoromethyl-
1,2,3,4-tetrahydro-4-quinazolinone;
2-carboxyethyl-3-o-tolyl-6-sulfamyl-7-chloro-1,2,3,4-
tetrahydro-4-quinazolinone;
2-carboxymethyl-3-o-tolyl-6-methylaminosulfonyl-7-
chloro-1,2,3,4-tetrahydro-4-quinazolinone;
2-carboxymethyl-3-(p-chlorophenyl)-6-sulfamyl-7-
chloro-1,2,3,4-tetrahydro-4-quinazolinone;
2-carboxymethyl-3-o-tolyl-6-methylaminosulfonyl-7-
chloro-1,2,3,4-tetrahydro-4-quinazolinone;
2-carboxymethyl-3-phenyl-6-sulfamyl-7-chloro-1,2,3,4-
tetrahydro-4-quinazolinone;
2-carboxymethyl-3-(2'-methyl-3'-chlorophenyl)-6-sulfamyl-7-chloro-1,2,3,4-tetrahydro-4-quinazolinone;
2-carboxymethyl-3-(p-chlorophenyl)-6-methylaminosulfonyl-7-chloro-1,2,3,4-tetrahydro-4-quinazolinone;
2-carboxymethyl-3-(2'-methylbenzyl)-6-sulfamyl-7-
chloro-1,2,3,4-tetrahydro-4-quinazolinone;
2-carboxymethyl-3-o-tolyl-6-sulfamyl-7-chloro-1,2,3,4-
tetrahydro-4-quinazolinone;
2-carboxypropyl-3-o-tolyl-6-sulfamyl-7-chloro-1,2,3,4-
tetrahydro-4-quinazolinone;
2-carboxybutyl-3-o-tolyl-6-sulfamyl-7-chloro-1,2,3,4-
tetrahydro-4-quinazolinone;
2-carboxypropyl-3-o-tolyl-6-sulfamyl-7-trifluoromethyl-
1,2,3,4-tetrahydro-4-quinazolinone;
2-carboxybutyl-3-o-tolyl-6-sulfamyl-7-trifluoromethyl-
1,2,3,4-tetrahydro-4-quinazolinone;
2-acetyloxy-3-o-tolyl-6-sulfamyl-7-chloro-1,2,3,4-
tetrahydro-4-quinazolinone;
2-acetyloxymethyl-3-o-tolyl-6-sulfamyl-7-chloro-1,2,3,4-
tetrahydro-4-quinazolinone;
2-chloroacetyloxymethyl-3-o-tolyl-6-sulfamyl-7-chloro-
1,2,3,4-tetrahydro-4-quinazolinone;
2-carbamido-3-o-tolyl-6-sulfamyl-7-chloro-1,2,3,4-
tetrahydro-4-quinazolinone;
2-methylcarbamido-3-o-tolyl-6-sulfamyl-7-chloro-
1,2,3,4-tetrahydro-4-quinazolinone;

2-piperidylcarbamido-3-o-tolyl-6-sulfamyl-7-chloro-1,2,3,4-tetrahydro-4-quinazolinone;
2-dimethyl-carbamido-(3'-sulfamyl-4'-chlorophenyl)-3-o-tolyl-6-sulfamyl-7-chloro-1,2,3,4-tetrahydro-4-quinazolinone;
2-piperidylcarbamido-(3'-sulfamyl-4'-chlorobenzyl)-3-o-tolyl-6-sulfamyl-7-chloro-1,2,3,4-tetrahydro-4-quinazolinone;
2-carboxymethyl-3-(o-hydroxyphenyl)-6-sulfamyl-7-chloro-1,2,34-tetrahydro-4-quinazolinone;
2-carboxymethyl-3-(o-methoxyphenyl)-6-sulfamyl-7-chloro-1,2,3,4-tetrahydro-4-quinazolinone;
2-carboxymethyl-3-(p-aminophenyl)-6-sulfamyl-7-chloro-1,2,3,4-tetrahydro-4-quinazolinone;
2-carboxymethyl-3-(2'-methyl-4'-aminophenyl)-6-sulfamyl-7-chloro-1,2,3,4-tetrahydro-4-quinazolinone;
2-carboxymethyl-3-(2'-methyl-3'-sulfamylphenyl)-6-sulfamyl-7-chloro-1,2,3,4-tetrahydro-4-quinazolinone;
2-carboxymethyl-3-(2'-methyl-3'-sulfamylphenyl)-6-sulfamyl-7-trifluoromethyl-1,2,3,4-tetrahydro-4-quinazolinone;
2-carboxyethyl-3-(2'-methyl-3'-chlorophenyl)-6-sulfamyl-7-trifluoromethyl-1,2,3,4-tetrahydro-4-quinazolinone;
2-carboxymethyl-3-(2'-methyl-3'-chlorophenyl)-6-methylaminosulfonyl-7-chloro-1,2,3,4-tetrahydro-4-quinazolinone;
2-carboxyethyl-3-(2'-sulfamylphenyl)-6-sulfamyl-7-chloro-1,2,3,4-tetrahydro-4-quinazolinone;
2-cyclopentyloxycarbonyl-3-o-tolyl-6-sulfamyl-7-chloro-1,2,3,4-tetrahydro-4-quinazolinone;
2-cyclobutyloxycarbonyl-3-o-tolyl-6-sulfamyl-7-chloro-1,2,3,4-tetrahydro-4-quiazolinone;
2-propyloxycarbonyl-3-o-tolyl-6-sulfamyl-7-trifluoromethyl-1,2,3,4-tetrahydro-4-quinazolinone;
2-acetyloxymethyl-3-o-tolyl-6-sulfamyl-7-chloro-1,2,3,4-tetrahydro-4-quinazolinone;
2-carboxymethyl-3-benzyl-6-sulfamyl-7-chloro-1,2,3,4-tetrahydro-4-quinazolinone;
1-benzyl-2-carboxymethyl-3-o-tolyl-6-sulfamyl-7-chloro-1,2,3,4-tetrahydro-4-quinazolinone;
2-carboxymethyl-3-(2'methyl-4'-chlorophenyl)-6-sulfamyl-7-chloro-1,2,3,4-tetrahydro-4-quinazolinone;
2-carboxymethyl-3-(2'-trifluoromethyl-4'-aminophenyl)-6-sulfamyl-7-chloro-1,2,3,4-tetrahydro-4-quinazolinone;

the sodium salt of 2-carboxymethyl-3-o-tolyl-6-sulfamyl-7-chloro-1,2,3,4-tetrahydro-4-quinazolinone, and the potassium salt of 2-carboxymethyl-3-o-tolyl-6-sulfamyl-7-chloro-1,2,3,4-tetrahydro-4-quinazolinone.

The above compounds have diuretic properties and can be used in the same manner and amounts as the compounds of U.S. Pat. 3,360,518.

Other suitable diuretic compounds are tabulated below in Table I.

TABLE I

Me=methyl
Et=ethyl
Ph=phenyl

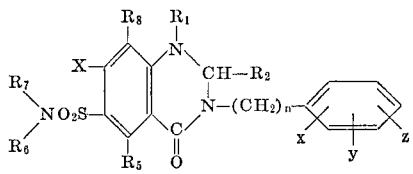

$R_1$ is hydrogen, loweralkyl, or phenylloweralkyl.

$R_2$ is —COOH, —alkyl—COOH, alkyl—COO—loweralkyl, —COO—lower alkyl, —CONH$_2$, —alkyl—CONH$_2$, —CONH—loweralkyl, alkyl—CONH—loweralkyl, —CON (loweralkyl)$_2$,

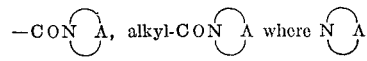

represents a heterocyclic ring.

$R_5$ is hydrogen, loweralkyl, loweralkoxy, loweralkoxyloweralkyl, hydroxy, amino, alkylamino, or cyano.

$R_8$ is any of $R_5$ $R_6$ is H, lower alkyl, or aralkyl $R_7$ is any of $R_6$. $R_6$ and $R_7$ may be joined together to form with the N atom a heterocyclic ring.

$x$ is hydrogen, loweralkyl, hydroxy, loweralkoxy, loweralkoxyloweralkyl, amino, sulfamyl, halogen, cyano, or trifluoromethyl, $y$ and $z$ are any of $x$.

X is halogen, trifluoromethyl or cyano and $n$ is an integer from 0 to 4.

| X | $R_1$ | $R_2$ | x | y | z | n | $R_5$ | $R_6$ | $R_7$ | $R_8$ |
|---|---|---|---|---|---|---|---|---|---|---|
| Cl | H | —COOMe | 2-Me | H | H | 0 | H | PhCH$_2$CH$_2$ | H | H |
| Cl | H | —COOMe | 2-Me | H | H | 0 | NHEt | H | H | H |
| Cl | Me | —COOEt | 2-Me | H | H | 0 | H | H | H | NHMe |
| Cl | H | —COOEt | 2-Me | H | H | 0 | H | PhCH$_2$CH$_2$ | H | Me |
| Cl | H | —CH$_2$COOME | 2-Me | H | H | 0 | H | Me | H | OME |
| CF$_3$ | H | —CH$_2$COOH | 2-Me | H | H | 1 | H | PhCH$_2$CH$_2$ | H | H |
| Cl | H | —CH$_2$CONH$_2$ | 2-Me | H | H | 0 | H | Et | Me | H |
| Cl | H | —CH$_2$CONH$_2$ | 2-Me | H | H | 1 | H | Et | Me | H |
| Cl | Me | —CH$_2$COOMe | 2-Me | H | H | 0 | H | Et | Me | H |
| Cl | Et | —CH$_2$COOMe | 2-Me | H | H | 0 | H | H | H | H |
| Cl | Et | —CH$_2$COOMe | 2-Me | H | H | 0 | OMe | Me | H | H |
| Cl | Et | —CH$_2$COOEt | 2-Me | H | H | 1 | H | Me | H | OMe |
| Cl | Et | —CH$_2$COOEt | 2-Me | H | H | 1 | H | H | H | NH$_2$ |
| Cl | H | —CONH$_2$ | 2-Me | 4-Cl | H | 0 | H | H | H | NH$_2$ |
| Cl | H | —COOH | 2-Me | H | H | 0 | NH$_2$ | H | H | H |
| Cl | H | —CH$_2$—COOH | 2-Me | H | H | 1 | NH$_2$ | H | H | H |
| Cl | H | —COOH | 2-Me | H | H | 0 | OMe | H | H | H |
| Cl | H | —COOH | 4-Cl | H | H | 0 | OMe | H | H | H |
| Cl | H | —COOH | 2-Me | H | H | 0 | H | H | H | NH$_2$ |
| Cl | H | —COOH | 2-Me | H | H | 0 | NH$_2$ | Me | H | H |
| Cl | H | —COOH | 2-Me | H | H | 0 | H | H | H | Me |
| Cl | H | —CH$_2$COOH | 2-Me | H | H | 0 | H | H | H | Me |
| Cl | H | —CH$_2$COOH | 2-Me | H | H | 0 | Me | Me | H | H |
| CF$_3$ | H | —CH$_2$COOH | 2-Me | H | H | 0 | NHMe | Me | H | H |
| Cl | H | —CH$_2$COOH | 2-Me | H | H | 1 | NHMe | Me | H | H |
| Cl | PhCH$_2$ | —COOH | 2-Me | H | H | 0 | H | H | H | H |
| Cl | PhCH$_2$CH$_2$ | —CONH$_2$ | 2-Me | H | H | 1 | H | H | H | H |
| Cl | PhCH$_2$CH$_2$ | —CONH$_2$ | 4-Me | H | H | 0 | H | H | H | H |
| Cl | PhCH$_2$CH$_2$ | —CH$_2$COOH | 2-Me | H | H | 1 | H | H | H | H |
| Cl | PhCH$_2$CH$_2$ | —CH$_2$COOMe | 2-Me | H | H | 0 | H | H | H | H |
| Cl | PhCH$_2$CH$_2$ | —CH$_2$COOEt | 4-Cl | H | H | 0 | H | H | H | H |
| Cl | PhCH$_2$ | —CH$_2$COOEt | 2-Me | H | H | 0 | H | H | H | H |
| Cl | H | —COHN$_2$ | 2-Me | H | H | 0 | NH$_2$ | H | H | H |
| Cl | H | —CONH$_2$ | 2-Me | H | H | 0 | OMe | H | H | H |

| X | R₁ | R₂ | x | y | z | n | R₅ | R₆ | R₇ | R₈ |
|---|---|---|---|---|---|---|---|---|---|---|
| Cl | H | —CONHMe | 2-Me | H | H | 0 | H | H | H | OMe |
| Cl | H | —CONMe₂ | 4-Me | H | H | 0 | NH₂ | H | H | H |
| Cl | H | —CONMe₂ | 2-Me | H | H | 0 | H | H | H | NH₂ |
| Cl | Me | —CONH₂ | 2-Me | H | H | 0 | H | PhCH₂ | H | H |
| Cl | Me | —CONH₂ | 2-Me | H | H | 1 | H | PhCH₂ | H | H |
| Cl | Me | —CONHMe | H | H | H | 0 | H | Et | Me | H |
| Cl | Me | —CONHMe | H | H | H | 1 | NH₂ | H | H | H |
| Cl | Me | —CONMe₂ | H | H | H | 1 | H | H | H | NH₂ |
| Cl | Me | —CONEt₂ | 4-Cl | H | H | 1 | H | H | H | NHMe |
| Cl | Et | —CONEt₂ | H | H | H | 0 | Me | H | H | NH₂ |
| Cl | Et | —CONEt₂ | H | H | H | 0 | NH₂ | H | H | Me |
| Cl | H | —COOEt | H | H | H | 0 | NH₂ | H | H | Me |
| Cl | H | —COOEt | H | H | H | 1 | NH₂ | H | H | Me |
| Cl | H | —COOH | H | H | H | 1 | H | H | H | H |
| Cl | H | —COOH | 2-Me | H | H | 0 | H | H | H | H |
| Cl | H | —COOH | 4-Me | H | H | 1 | H | H | H | H |
| Cl | H | —COOH | 3-Me | H | H | 1 | H | H | H | H |
| Cl | H | —CH₂COOH | H | H | H | 1 | H | H | H | H |
| Cl | H | —CH₂COOH | 2-Me | H | H | 0 | H | H | H | H |
| Cl | H | —CH₂COOH | 3-Me | H | H | 1 | H | H | H | H |
| Cl | H | —CH₂COOH | 4-Me | H | H | 2 | H | H | H | H |
| Cl | H | —CH₂CH₂COOH | H | H | H | 1 | H | H | H | H |
| Cl | H | —CH₂CH₂COOH | 2-Me | H | H | 0 | H | H | H | H |
| CF₃ | H | —CH₂COOH | 2-Me | H | H | 1 | H | H | H | H |
| CF₃ | H | —CH₂COOH | 4-Me | H | H | 1 | H | H | H | H |
| CF₃ | H | —CH₂CH₂COOH | 2-Me | H | H | 1 | H | H | H | H |
| CF₃ | H | —CH₂CH₂COOH | 4-Me | H | H | 1 | H | H | H | H |
| Cl | H | —COOH | H | H | H | 1 | H | Me | H | H |
| Cl | Me | —COOH | 2-Me | H | H | 1 | H | Me | H | H |
| Cl | Et | —COOH | 2-Me | H | H | 1 | H | H | H | H |
| Cl | Me | —COOEt | H | H | H | 0 | H | H | H | H |
| Cl | Me | —COOEt | 2-Me | H | H | 1 | H | H | H | H |
| Cl | Et | —COOEt | 2-Me | H | H | 1 | H | H | H | H |
| Cl | —CH₂CH(Me)₂ | —COOEt | 2-Me | H | H | 1 | H | H | H | H |
| Cl | Pr | —COOEt | 2-Me | H | H | 1 | H | H | H | H |
| Cl | H | —COOMe | H | H | H | 1 | H | H | H | H |
| Cl | H | —COOEt | H | H | H | 1 | H | H | H | H |
| Cl | H | —COOCH(Me)₂ | H | H | H | 1 | H | H | H | H |
| Cl | H | —COOMe | 2-Me | H | H | 0 | H | H | H | H |
| Cl | H | —COOEt | 2-Me | H | H | 1 | H | H | H | H |
| Cl | H | —COOCH(Me)₂ | 2-Me | H | H | 1 | H | H | H | H |
| Cl | H | —COOMe | 3-Me | H | H | 1 | H | H | H | H |
| Cl | H | —COOEt | 3-Me | H | H | 2 | H | H | H | H |
| Cl | H | —COOCH(Me)₂ | 3-Me | H | H | 1 | H | H | H | H |
| Cl | H | —COOMe | 4-Me | H | H | 1 | H | H | H | H |
| Cl | H | —COOEt | 4-Me | H | H | 1 | H | H | H | H |
| Cl | H | —CONH₂ | H | H | H | 1 | H | H | H | H |
| Cl | H | —CONH₂ | 2-Me | H | H | 1 | H | H | H | H |
| Cl | H | —CONH₂ | 3-Me | H | H | 1 | H | H | H | H |
| Cl | H | —CONH₂ | 4-Me | H | H | 1 | H | H | H | H |
| CF₃ | H | —CONH₂ | 2-Me | H | H | 1 | H | H | H | H |
| Cl | H | —CONH₂ | 2-Me | H | H | 1 | H | Me | H | H |
| Cl | Et | —CONH₂ | 2-Me | H | H | 1 | H | H | H | H |
| Cl | Pr | —CONH₂ | 2-Me | H | H | 1 | H | H | H | H |
| Cl | Et | —CONH₂ | 4-Me | H | H | 1 | H | H | H | H |
| Cl | Pr | —CONH₂ | 4-Me | H | H | 1 | H | H | H | H |
| Cl | H | —CONHMe | H | H | H | 1 | H | H | H | H |
| Cl | H | —CONHEt | H | H | H | 1 | H | H | H | H |
| Cl | H | —CONHPr | H | H | H | 1 | H | H | H | H |
| Cl | H | —CONHMe | 2-Me | H | H | 1 | H | H | H | H |
| Cl | H | —CONHEt | 2-Me | H | H | 2 | H | H | H | H |
| Cl | H | —CONHPr | 2-Me | H | H | 1 | H | H | H | H |
| Cl | H | —CONHMe | 3-Me | H | H | 0 | H | H | H | H |
| Cl | H | —CONHEt | 3-Me | H | H | 1 | H | H | H | H |
| Cl | H | —CONHMe | 4-Me | H | H | 1 | H | H | H | H |
| Cl | H | —CONHEt | 4-Me | H | H | 1 | H | H | H | H |
| Cl | H | —CONMe₂ | H | H | H | 1 | H | H | H | H |
| Cl | H | —CONEt₂ | H | H | H | 1 | H | H | H | H |
| Cl | H | —CONMe₂ | 2-Me | H | H | 1 | H | H | H | H |
| Cl | H | —CONEt₂ | 2-Me | H | H | 1 | H | H | H | H |
| Cl | H | —CONMe₂ | 3-Me | H | H | 1 | H | H | H | H |
| Cl | H | —CONEt₂ | 3-Me | H | H | 1 | H | H | H | H |
| Cl | H | —CONMe₂ | 4-Me | H | H | 1 | H | H | H | H |
| Cl | H | —CONEt₂ | 4-Me | H | H | 1 | H | H | H | H |
| Cl | H | —CONMe₂ | 2-Me | H | H | 1 | H | Me | H | H |
| Cl | Me | —CONMe₂ | 2-Me | H | H | 1 | H | H | H | H |
| Cl | H | —COOH | 4-Cl | H | H | 1 | H | H | H | H |
| Cl | H | —CONH₂ | 4-Cl | H | H | 1 | H | H | H | H |
| Cl | H | —COOH | 2-CF₃ | H | H | 1 | H | H | H | H |
| Cl | H | —CONH₂ | 2-CF₃ | H | H | 1 | H | H | H | H |
| Cl | H | —COOH | 2-Me | 4-Cl | H | 1 | H | H | H | H |
| Cl | H | —COOH | 2-Me | 6-Me | H | 1 | H | H | H | H |
| Cl | H | —CONH₂ | 2-Me | 6-Me | H | 1 | H | H | H | H |
| Cl | Me | —COOMe | 2-Me | H | H | 0 | Me | Et | H | H |
| Cl | Me | —COOEt | 4-Cl | H | H | 0 | H | Me | Me | H |
| Cl | H | —CONH₂ | 2-Me | H | H | 0 | H | PhCH₂ | H | H |
| Cl | H | —CH₂COOEt | H | H | H | 0 | H | Me | H | Me |
| Cl | H | —CH₂COOMe | H | H | H | 0 | NH₂ | H | H | Me |
| Cl | H | —COOPr | H | H | H | 0 | H | Me | H | PhCH₂ |
| Cl | H | —COOMe | 2-Me | H | H | 0 | H | —CH₂CH₂OCH₂CH₂— | | H |
| Cl | H | —CH₂COOMe | 2-Me | H | H | 0 | H | —CH₂CH₂NHCH₂CH₂— | | H |
| Cl | H | —CONH₂ | H | H | H | 0 | H | —CH₂OCH₂CH₂— | | H |
| Cl | H | —CONHMe | 4-Me | H | H | 0 | H | —CH₂CH₂NHCH₂CH₂— | | H |
| Cl | H | —COOMe | 2-Me | H | H | H | | —CH₂CH₂NHCH₂— | | H |
| Cl | H | —CON⌬ | 2-Me | H | H | 0 | H | H | H | H |
| Cl | H | —CON⌬NH | 2-Me | H | H | 0 | H | H | H | H |
| Cl | H | —CON⌬O | 2-Me | H | H | 0 | H | H | H | H |

The following example is given to illustrate the preparation of compounds of this invention:

Preparation of 2-carboxy-7-chloro-6-sulfamyl-3-(o-tolyl)-1,2,3,4-tetrahydro-4-quinazolinone Synthetic route:

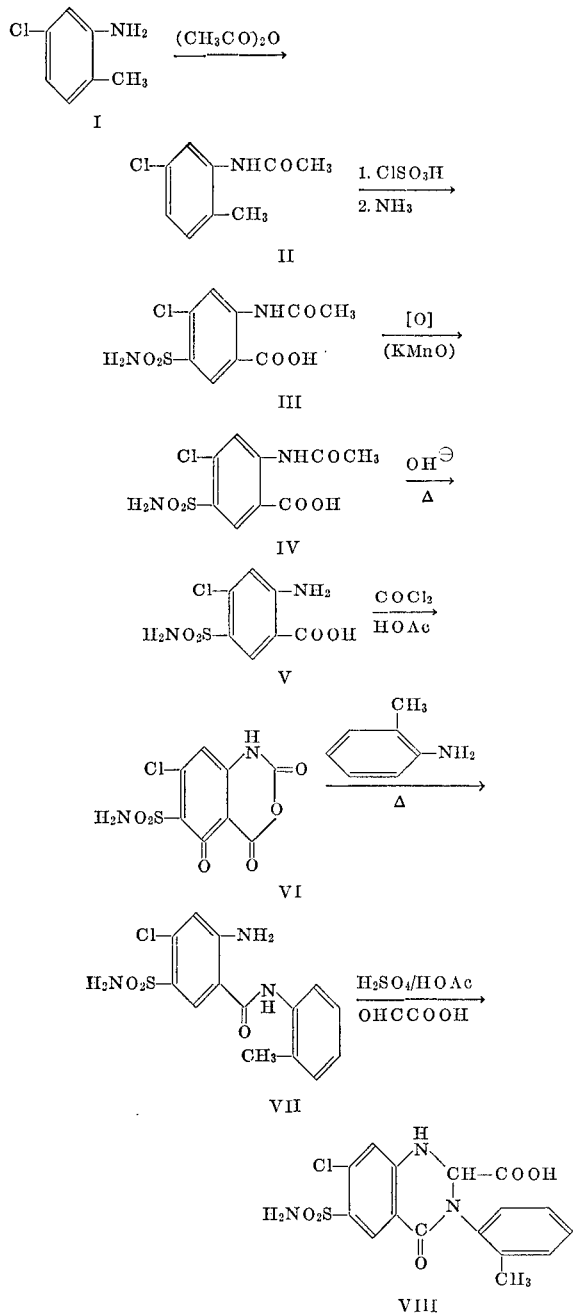

PREPARATION OF 5-CHLORO-2-METHYL-ACETANILIDE, II 5-chloro-o-toluidine (I), (1000 gm.) was added to 9000 ml. of water, pre-heated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

PREPARATION OF 5-CHLORO-2-METHYL-4-SULFAMYLACETANILIDE, III

Chlorosulfonic acid (1000 gm.) was placed in a nitrogen flushed 5 liter, 3 neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

PREPARATION OF N-ACETYL-4-CHLORO-5-SULFAMYL ANTHRANILIC ACID, IV

Into a 12 liter was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved (under Lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

PREPARATION OF 4-CHLORO-5-SULFAMYL-ANTHRANILIC ACID, V

N - acetyl - 4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

PREPARATION OF 7-CHLORO-6-SULFAMYL-ISATOIC ANHYDRIDE, VI 4-chloro-5-sulfamylanthranilic acid (664 gm.) was slurried in 8000 ml. glacial acetic acid and 800 gm. liquid phosgene was added with good stirring. It was stirred vigorously for three hours at room temperature, filtered and washed with 1000 ml. acetic acid and 2000 ml. anhydrous ether. After drying in vacuo over phosphorous pentoxide, it weighed 698 gm. and melted at 290–292°. This material was combined with the lots obtained in runs 746–742, and 747–570. The total weight of product was 2214 gm. from 2000 gm. of starting material.

PREPARATION OF 2-AMINO-4-CHLORO-5-SULFAMYL-N-(O-TOLYL)-BENZAMIDE, VII 7-chloro-6-sulfamylisatoic anhydride (720 gm.) was addded to a 12 liter nitrogen flushed flask containing 4200 ml. o-toluidine and the mixture was stirred for ½ hour. It was then heated to 178° (solution occurred at ~177°) and kept at about 175° for 10 minutes. It was allowed to cool to 60° by removing the heating mantle, then cooled rapidly to 25° with an ice bath. Ether (4200 ml.) was added, the mixture was stirred for a few minutes, filtered and washed thoroughly with ether. The crude product was slurried with 9000 ml. isopropanol, filtered, washed twice with 2000 ml. isopropanol, twice with 2500 ml. 8% aqueous ammonia, once with 2000 ml. water, twice with 1000 ml. isopropanol and finally three times with 2000 ml. ether. After air drying, the product weighed 560 gm. and melted at 287–289°. This partially purified amide was combined with the product obtained in runs 743–870 and 747–574 and the total (1573 gm.) was recrystallized (under Lot #743–871). The amide was dissolved in 3000 ml. dimethylformamide, filtered with celite and heated to 90°. To the resulting solution was added all at once, 1800 ml. 95° water. The suspension that resulted was allowed to cool with stirring over 20 hours, then filtered and washed with 1000 ml. 2:1 dimthylformamide:water, 2000 ml. methanol and 1500 ml. ether. After drying the product weighed 1458 gm. and melted at 289–292° with decomposition.

*Analysis.*—Calcd. for $C_{14}H_{14}ClN_3O_3S$ (percent): C, 49.48; H, 4.15; N, 12.36; Cl 10.43; S, 9.44. Found (percent): C, 49.66; H, 4.23; N, 12.41; Cl, 10.43; S, 9.55.

PREPARATION OF 2 - CARBOXY - 7 - CHLORO - 6 - SULFAMYL - 3 - (O - TOLYL) - 1,2,3,4 - TETRAHYDRO-4-QUINAZOLINONE, VIII

2 - amino - 4-chloro-5-sulfamyl-N-(o-tolyl)-benzamide (15 gm.) was slurried with 9 gm. glyoxylic acid monohydrate and 50 ml. glacial acetic acid. Ten drops of concentrated sulfuric acid was added and the mixture was stirred for 24 hours. Water (200 ml.) was added and the solid filtered, dried, and recrystallized from 1 liter of 80% isopropanol-water. Wt. 4–5 gm., M.P. 180–95 dec.

Calcd. (percent): C, 48.55; H, 3.56; N, 10.62; Cl, 8.96. Found (percent): C, 47.36, 48.19; H, 3.85, 4.23; N, 10.07, 9.75; Cl, 9.05.

The other compounds of this invention can be made by modification of ingredients and quantities of the above example as is well understood by those skilled in the art. For example, the unsaturated quinazolinone compounds can be readily converted to the corresponding 1,2,3,4-tetrahydro-4(3H)-quinazolinones by reduction with sodium borohydride.

From pharmacology tests run on 2-carboxy-3-o-tolyl-6 - sulfamyl - 7 - chloro - 1,2,3,4 - tetrahydro - 4(3H) - quinazolinone (compound K) and other indications and analogy, it appears that the compounds of this invention are effective diuretics, saluretics, and antihypertensives with low toxicity. For example, the following is a summary of the pharmacology on compound K.

SUMMARY (a) Symptomatology and Acute LD50 in mice:
Orally—LD50>1000 mg./kg. (48 hours)
Interperitoneal—LD50>316 mg./kg. (48 hours)

(b) Cardiovascular in dog: Doses intravenously up to 10 mg./kg. were administered. There were no changes in the cardiovascular system.

(c) Diuretic assay in rats: When administered by the oral route in initial assays measuring output of urine (ml./kg.), Na+, and Cl− (meq./kg.) at 4 hours and 21 hours after drug administration, K was found to promote water and salt loss, has a rapid onset and prolonged action, and appears to have a potency on volume diuresis better than that of quinethazone.

From the above and other tests applicant states that the compounds described in this specification and those coming under the generic formula are effective and safe diuretics when administered to warm-blooded animals in the same manner and amounts as for quinethazone.

In the preceding specification the temperatures, wherever given, are in degrees centigrade.

Various modifications of the structural formula in column 1 of the specification may be made, such as, for example, has been done for other tetrahydro-7-halo-6-sulfamyl-4-quinazolinones known to the art, without departing from the spirit of the invention.

It will also be understood that any of the groups of $R_2$ may be substituted for the 2 hydrogen of the heterocycle to give a di compound or a spiro compound.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the general formula

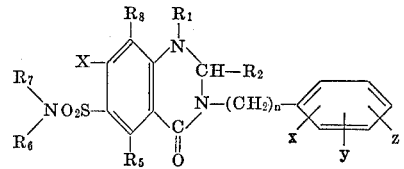

or the pharmaceutically acceptable salts thereof in which
$R_1$ is hydrogen, loweralkyl, or phenylloweralkyl;
$R_2$ is —COOH, loweralkyl-COOH, loweralkyl-COO-loweralkyl, —COO-loweralkyl, —CONH$_2$, loweralkyl-CONH$_2$, —CONH-loweralkyl, loweralkyl-CONH-loweralkyl, —CON(loweralkyl)$_2$.

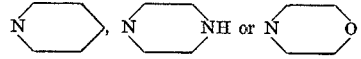

represents $$\underset{N}{\bighexagon}, \underset{N}{\bighexagon}NH \text{ or } \underset{N}{\bighexagon}O$$

$R_5$ is hydrogen, loweralkyl, loweralkoxy, loweralkoxyloweralkyl, hydroxy, amino, loweralkylamino, or cyano;
$R_8$ is any of $R_5$;
$R_6$ is H, lower alkyl, or phenylalkyl;
$R_7$ is any of $R_6$, and $R_6$ and $R_7$ optionally are morpholino or —$_n$(CH$_2$)—NH—(CH$_2$)$_n$— where $n$ is 1 to 3;
$x$ is hydrogen, loweralkyl, hydroxy, loweralkoxy, loweralkoxyloweralkyl, amino, sulfamyl, halogen, cyano, or trifluoromethyl, $y$ and $z$ are any of $x$;
X is halogen, trifluoromethyl or cyano and $n$ is an integer from 0 to 4.

2. The compound of claim 1, wherein X is chlorine, $R_1$ is hydrogen, $R_2$ is COOH, $R_5$, $R_6$, $R_7$, and $R_8$ are all hydrogen, $x$ is orthomethyl, $y$ and $z$ are both hydrogen, and $n$ is 0.

3. The compound of claim 1 wherein X is chlorine, $R_1$ is hydrogen, $R_2$ is COOH$_3$, $R_5$, $R_6$, $R_7$, and $R_8$ are all hydrogen, $x$ is orthotrifluoromethyl, $y$ and $z$ are both hydrogen, and $n$ is 0.

4. The compound of claim 1 wherein X is chlorine, $R_1$ is hydrogen, $R_2$ is COOCH$_3$, $R_5$, $R_6$, $R_7$, and $R_8$ are all hydrogen, $x$ is orthomethyl, $y$ and $z$ are both hydrogen, and $n$ is 0.

5. The compound of claim 1 wherein X is chlorine, $R_1$ is hydrogen, $R_2$ is COOCH$_3$, $R_5$, $R_6$, $R_7$, and $R_8$ are all hydrogen, $x$ is orthotrifluoromethyl, $y$ and $z$ are both hydrogen, and $n$ is 0.

6. The compound of claim 1 wherein X is chlorine, $R_1$ is hydrogen, $R_2$ is $CH_2COOH$, $R_5$, $R_6$, $R_7$, and $R_8$ are all hydrogen, $x$ is orthomethyl, $y$ and $z$ are both hydrogen, and $n$ is 0.

7. The compound of claim 1 wherein X is chlorine, $R_1$ is hydrogen, $R_2$ is $CH_2COOH$, $R_5$, $R_6$, $R_7$, and $R_8$ are all hydrogen, $x$ is orthotrifluoromethyl, $y$ and $z$ are both hydrogen, and $n$ is 0.

8. The compound of claim 1 wherein X is chlorine $R_1$ is hydrogen, $R_2$ is $CH_2COOCH_3$, $R_5$, $R_6$, $R_7$, and $R_8$ are all hydrogen, $x$ is orthomethyl, $y$ and $z$ are both hydrogen, $n$ is 0.

9. The compound of claim 1 wherein X is chlorine, $R_1$ is hydrogen, $R_2$ is $CH_2COOCH_3$, $R_5$, $R_6$, $R_7$, and $R_8$ are all hydrogen, $x$ is orthotrifluoromethyl, $y$ and $z$ are both hydrogen, and $n$ is 0.

10. The compound of claim 1 wherein X is chlorine, $R_1$ is hydrogen, $R_2$ is $CH_2CH_2COOH$, $R_5$, $R_6$, $R_7$, and $R_8$ are all hydrogen, $x$ is orthomethyl, $y$ and $z$ are both hydrogen, and $n$ is 0.

11. The compound of claim 1 wherein X is chlorine, $R_1$ is hydrogen, $R_2$ is $CH_2CH_2COOH$, $R_5$, $R_6$, $R_7$, and $R_8$ are all hydrogen, $x$ orthotrifluoromethyl, $y$ and $z$ are both hydrogen, and $n$ is 0.

12. The compound of claim 1 wherein X is chlorine, $R_1$ is hydrogen, $R_2$ is $CH_2CH_2COOCH_3$, $R_5$, $R_6$, $R_7$, and $R_8$ are all hydrogen, $x$ is orthomethyl, $y$ and $z$ are both hydrogen, and $n$ is 0.

13. The compound of claim 1 wherein X is chlorine, $R_1$ is hydrogen, $R_2$ is $CH_2CH_2COOCH_3$, $R_5$, $R_6$, $R_7$, and $R_8$ are all hydrogen, $x$ is orthotrifluoromethyl, $y$ and $z$ are both hydrogen, and $n$ is 0.

14. The compound of claim 1 wherein X is chlorine, $R_1$ is hydrogen, $R_2$ is $CONH_2$, $R_5$, $R_6$, $R_7$, and $R_8$ are all hydrogen, $x$ is orthomethyl, $y$ and $z$ are both hydrogen, $n$ is 0.

15. The compound of claim 1 wherein X is chlorine, $R_1$ is hydrogen, $R_2$ is $CONH_2$, $R_5$, $R_6$, $R_7$, and $R_8$ are all hydrogen, $x$ is orthotrifluoromethyl, $y$ and $z$ are both hydrogen, and $n$ is 0.

16. The compound of claim 1 wherein X is chlorine, $R_1$ is hydrogen, $R_2$ is $$CON\diagup\diagdown O$$

$R_5$, $R_6$, $R_7$, and $R_8$ are all hydrogen, $x$ orthomethyl, $y$ and $z$ are both hydrogen, and $n$ is 0.

17. The compound of claim 1 wherein X is chlorine, $R_1$ is hydrogen, $R_2$ is $$CON\diagup\diagdown O$$

$R_5$, $R_6$, $R_7$, and $R_8$ are all hydrogen, $x$ orthotrifluoromethyl, $y$ and $z$ are both hydrogen, and $n$ is 0.

18. The compound of claim 1 wherein X is chlorine, $R_1$ is hydrogen, $R_2$ is $$CON\diagup\diagdown$$

$R_5$, $R_6$, $R_7$, and $R_8$ are all hydrogen, $x$ orthomethyl, $y$ and $z$ are both hydrogen, and $n$ is 0.

19. The compound of claim 1 wherein X is chlorine, $R_1$ is hydrogen, $R_2$ is $$CON\diagup\diagdown$$

$R_5$, $R_6$, $R_7$, and $R_8$ are all hydrogen, $x$ orthotrifluoromethyl, $y$ and $z$ are both hydrogen, and $n$ is 0.

20. The compound of claim 1 wherein X is chlorine, $R_1$ is hydrogen, $R_2$ is $$CON\diagup\diagdown NH$$

$R_5$, $R_6$, $R_7$, and $R_8$ are all hydrogen, $x$ is orthomethyl, $y$ and $z$ are both hydrogen, and $n$ is 0.

21. The compound of claim 1 wherein X is chlorine, $R_1$ is hydrogen, $R_2$ is $$CON\diagup\diagdown NH$$

$R_5$, $R_6$, $R_7$, and $R_8$ are all hydrogen, $x$ is orthotrifluoromethyl, $y$ and $z$ are both hydrogen, and $n$ is 0.

22. The compound of claim 1 wherein X is chlorine, $R_1$ is hydrogen, $R_2$ is $$CON\diagup\diagdown N\text{-Ph}$$

$R_5$, $R_6$, $R_7$, and $R_8$ are all hydrogen, $x$ is orthomethyl, $y$ and $z$ are both hydrogen, and $n$ is 0.

23. The compound of claim 1 wherein X is chlorine, $R_1$ is hydrogen, $R_2$ is $$CON\diagup\diagdown N\text{-Ph}$$

$R_5$, $R_6$, $R_7$, and $R_8$ are all hydrogen, $x$ is orthotrifluoromethyl, $y$ and $z$ are both hydrogen, and $n$ is 0.

24. The compound of claim 1 wherein X is chlorine, $R_1$ is hydrogen, $R_2$ is $$CON\diagup\diagdown N\text{-Me}$$

$R_5$, $R_6$, $R_7$, and $R_8$ are all hydrogen, $x$ is orthomethyl, $y$ and $z$ are both hydrogen, and $n$ is 0.

25. The compound of claim 1 wherein X is chlorine, $R_1$ is hydrogen, $R_2$ is $$CON\diagup\diagdown N\text{-Me}$$

$R_5$, $R_6$, $R_7$, and $R_8$ are all hydrogen, $x$ is orthotrifluoromethyl, $y$ and $z$ are both hydrogen, and $n$ is 0.

26. The compound of claim 1 wherein X is chlorine, $R_1$ is hydrogen, $R_2$ is $CH_2CONH_2$, $R_5$, $R_6$, $R_7$, and $R_8$ are all hydrogen, $x$ is orthomethyl, $y$ and $z$ are both hydrogen, and $n$ is 0.

27. The compound of claim 1 wherin X is chlorine, $R_1$ is hydrogen, $R_2$ is $CH_2CONH_2$, $R_5$, $R_6$, $R_7$, and $R_8$ are all hydrogen, $x$ is orthotrifluoromethyl, $y$ and $z$ are both hydrogen, and $n$ is 0.

28. The compound of claim 1 wherin X is chlorine, $R_1$ is hydrogen, $R_2$ is $$CH_2CON\diagup\diagdown O$$

$R_5$, $R_6$, $R_7$, and $R_8$ are all hydrogen, $x$ is orthomethyl, $y$ and $z$ are both hydrogen, and $n$ is 0.

29. The compound of claim 1 wherein X is chlorine, $R_1$ is hydrogen, $R_2$ is $$CH_2CON\diagup\diagdown O$$

$R_5$, $R_6$, $R_7$, and $R_8$ are all hydrogen, $x$ is orthotrifluoromethyl, $y$ and $z$ are both hydrogen, and $n$ is 0.

30. The compound of claim 1 wherein X is chlorine, $R_1$ is hydrogen, $R_2$ is $$CH_2CON\diagup\diagdown$$

$R_5$, $R_6$, $R_7$, and $R_8$ are all hydrogen, $x$ is orthomethyl, $y$ and $z$ are both hydrogen, and $n$ is 0.

31. The compound of claim 1 wherein X is chlorine, $R_1$ is hydrogen, $R_2$ is $$CH_2CON\diagup\diagdown$$

$R_5$, $R_6$, $R_8$, and $R_7$ are all hydrogen, $x$ is orthotrifluoromethyl, $y$ and $z$ are both hydrogen, and $n$ is 0.

32. The compound of claim 1 wherein X is chlorine, $R_1$ is hydrogen, $R_2$ is

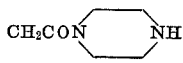

$R_5$, $R_6$, $R_7$, and $R_8$ are all hydrogen, $x$ is orthomethyl, $y$ and $z$ are both hydrogen, and $n$ is 0.

33. The compound of claim 1 wherein X is chlorine, $R_1$ is hydrogen, $R_2$ is

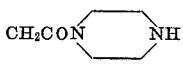

$R_5$, $R_6$, $R_7$, and $R_8$ are all hydrogen, $x$ is orthotrifluoromethyl, $y$ and $z$ are both hydrogen, and $n$ is 0.

34. The compound of claim 1 wherein X is chlorine, $R_1$ is hydrogen, $R_2$ is

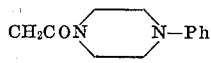

$R_5$, $R_6$, $R_7$, and $R_8$ are all hydrogen, $x$ is orthomethyl, $y$ and $z$ are both hydrogen, and $n$ is 0.

35. The compound of claim 1 wherein X is chlorine, $R_1$ is hydrogen, $R_2$ is

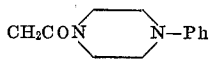

$R_5$, $R_6$, $R_7$, and $R_8$ are all hydrogen, $x$ is orthotrifluoromethyl, $y$ and $z$ are both hydrogen, and $n$ is 0.

36. The compound of claim 1 wherin X is chlorine, $R_1$ is hydrogen, $R_2$ is

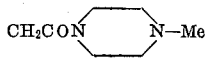

$R_5$, $R_6$, $R_7$, and $R_8$ are all hydrogen, $x$ is orthomethyl, $y$ and $z$ are both hydrogen, and $n$ is 0.

37. The compound of claim 1 wherein X is chlorine, $R_1$ is hydrogen, $R_2$ is

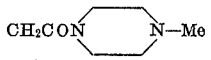

$R_5$, $R_6$, $R_7$, and $R_8$ are all hydrogen, $x$ is orthotrifluoromethyl, $y$ and $z$ are both hydrogen, and $n$ is 0.

38. The compound of claim 1 wherein X is chlorine, $R_1$ is hydrogen, $R_2$ is CONHMe, $R_5$, $R_6$, $R_7$, and $R_8$ are all hydrogen, $x$ is orthomethyl, $y$ and $z$ are both hydrogen, and $n$ is 0.

39. The compound of claim 1 wherein X is chlorine, $R_1$ is hydrogen, $R_2$ is CONHMe, $R_5$, $R_6$, $R_7$, and $R_8$ are all hydrogen, $x$ is orthotrifluoromethyl, $y$ and $z$ are both hydrogen, and $n$ is 0.

40. The compound of claim 1 wherein X is chlorine, $R_1$ is hydrogen, $R_2$ is CONHMe, $R_5$, $R_6$, $R_7$, and $R_8$ are all hydrogen, $x$ is orthomethyl, $y$ and $z$ are both hydrogen, and $n$ is 0.

41. The compound of claim 1 wherein X is chlorine, $R_1$ is hydrogen, $R_2$ is CONHMe, $R_5$, $R_6$, $R_7$, and $R_8$ are all hydrogen, $x$ is orthotrifluoromethyl, $y$ and $z$ are both hydrogen, and $n$ is 0.

42. The compound of claim 1 wherein X is chlorine, $R_1$ is hydrogen, $R_2$ is $CONMe_2$, $R_5$, $R_6$, $R_7$, and $R_8$ are all hydrogen, $x$ is orthomethyl, $y$ and $z$ are both hydrogen, and $n$ is 0.

43. The compound of claim 1 wherein X is chlorine, $R_1$ is hydrogen, $R_2$ is $CONMe_2$, $R_5$, $R_6$, $R_7$, and $R_8$ are all hydrogen, $x$ is orthotrifluoromethyl, $y$ and $z$ are both hydrogen, and $n$ is 0.

44. The compound of claim 1 wherein X is chlorine, $R_1$ is hydrogen, $R_2$ is $CH_2CONMe_2$, $R_5$, $R_6$, $R_7$, and $R_8$ are all hydrogen, $x$ is orthomethyl, $y$ and $z$ are both hydrogen, and $n$ is 0.

45. The compound of claim 1 wherein X is chlorine, $R_1$ is hydrogen, $R_2$ is $CH_2CONMe_2$, $R_5$, $R_6$, $R_7$, and $R_8$ are all hydrogen, $x$ is orthotrifluoromethyl, $y$ and $z$ are both hydrogen, and $n$ is 0.

46. The compound of claim 1 wherin X is chlorine, $R_1$ is hydrogen, $R_2$ is $COOCH_2CH_3$, $R_5$, $R_6$, $R_7$, and $R_8$ are all hydrogen, $x$ is orthomethyl, $y$ and $x$ are both hydrogen, and $n$ is 0.

References Cited
UNITED STATES PATENTS

| | | | |
|---|---|---|---|
| 3,092,631 | 6/1963 | Song et al. | 260—256.5 |
| 3,360,518 | 12/1967 | Shetty | 260—256.5 |

ALEX MAZEL, Primary Examiner

R. J. GALLAGHER, Assistant Examiner

U.S. Cl. X.R.

260—244, 256.5, 397.7; 424—79, 251

UNITED STATES PATENT OFFICE
CERTIFICATE OF CORRECTION

Patent No. 3,549,629         Dated December 22, 1970

Inventor(s) BOLA VITHAL SHETTY

It is certified that error appears in the above-identified patent and that said Letters Patent are hereby corrected as shown below:

Column 10, Claim 3, "$COOH_3$" should be --COOH--.

Column 11, Claim 8, insert --and-- before "n is 0".

Claim 11, insert --is-- before "orthotrifluoromethyl".

Claim 14, insert --and-- before "n is 0".

Column 14, Claim 40, "CONHMe" should be --$CH_2$CONHMe--.

Claim 41, "CONHMe" should be --$CH_2$CONHMe--.

Signed and sealed this 30th day of March 1971.

(SEAL)
Attest:

EDWARD M. FLETCHER, JR.
Attesting Officer

WILLIAM E. SCHUYLER, JR
Commissioner of Patents